United States Patent [19]

Banick et al.

[11] Patent Number: 5,032,812
[45] Date of Patent: Jul. 16, 1991

[54] SOLENOID ACTUATOR HAVING A MAGNETIC FLUX SENSOR

[75] Inventors: Gerard S. Banick, West Orange; John J. Haller, Boonton, both of N.J.

[73] Assignee: Automatic Switch Company, Florham Park, N.J.

[21] Appl. No.: 486,967

[22] Filed: Mar. 1, 1990

[51] Int. Cl.$^5$ .............................................. H01H 73/12
[52] U.S. Cl. ...................................... 335/17; 335/79; 335/234
[58] Field of Search ................... 335/17, 151, 153, 154, 335/78, 79, 229, 230, 234; 251/129.01

[56] References Cited

U.S. PATENT DOCUMENTS

| | | | |
|---|---|---|---|
| 3,401,362 | 9/1968 | Spiroch et al. | 335/17 |
| 4,004,258 | 1/1977 | Arnold | 335/17 |
| 4,035,789 | 7/1977 | Akita et al. | 335/229 X |

Primary Examiner—George Harris
Attorney, Agent, or Firm—Alan H. Levine

[57] ABSTRACT

A solenoid actuator comprising a coil or coils of electrical wire and a plugnut and movable core within the coil(s). A magnetic yoke surrounds the coil(s), the axis of the latter extending across the magnetic circuit defined by the yoke. Relatively large and small permanent magnets are associated with the yoke on opposite sides of the axis, the magnets producing flux in opposite directions. A flux sensor, closer to the small magnet, senses changes in direction of the flux. When the core and plugnut are separated, the large magnet flux predominates throughout the yoke. When the core engages the plugnut, the small magnet flux predominates in its portion of the yoke, this change in flux direction being detected by the sensor. Thus, the sensor can be used to indicate the position of the core with respect to the plugnut.

14 Claims, 3 Drawing Sheets

SOLENOID ACTUATOR HAVING A MAGNETIC FLUX SENSOR

With certain types of solenoid actuators or in certain types of installations incorporating such actuators, the condition of the actuator is not readily determinable, i.e., it is not apparent whether the movable armature, or core, is in engagement with or spaced from the stationary armature, or plugnut.

One type of solenoid actuator presenting this problem is an actuator having a magnetic latch arrangement. In such an actuator, the solenoid coil is energized momentarily to attract the core into engagement with the plugnut. Upon deenergization of the coil, the core is maintained in engagement with the plugnut by a permanent magnet which produces a flux in the magnetic circuit in the same direction as that which was produced by the original energization of the coil. The core is thus "latched" to the plugnut by the permanent magnet flux.

When it is desired to "unlatch" the core, the solenoid coil is energized with electrical current of opposite polarity to the current originally applied to the coil, or a second coil wound in a direction opposite to the first coil is energized. In either case, the coil produces a magnetic flux which is opposite to, and hence neutralizes, the flux produced by the permanent magnet, thereby allowing a return spring to separate the plugnut and core and move the later to a position spaced from the plugnut.

In this type of solenoid actuator, the coil is never continuously energized to maintain the core in one of its positions or the other. Instead, only momentary pulses are applied to the coil or coils to shift the core between its positions engaging, or spaced from, the plugnut. Thus, a magnetic latch solenoid actuator presents the problem of not readily indicating its state or condition. In the past, various types of limit switches were utilized to solve this problem, but these present their own problems of requiring complicated mechanical linkages and adjustments.

It is an object of the present invention to provide a solenoid actuator, such as one incorporating a magnetic latch, having a simple arrangement for continuously indicating the condition of the actuator.

It is another object of the invention to provide such a solenoid actuator, wherein the direction of magnetic flux in at least a part of the magnetic circuit surrounding the solenoid coil reverses each time the condition of the actuator changes, incorporating a sensor for detecting each reversal of flux direction.

Additional objects and features of the invention will be apparent from the following description, in which reference is made to the accompanying drawings.

Figure 1:
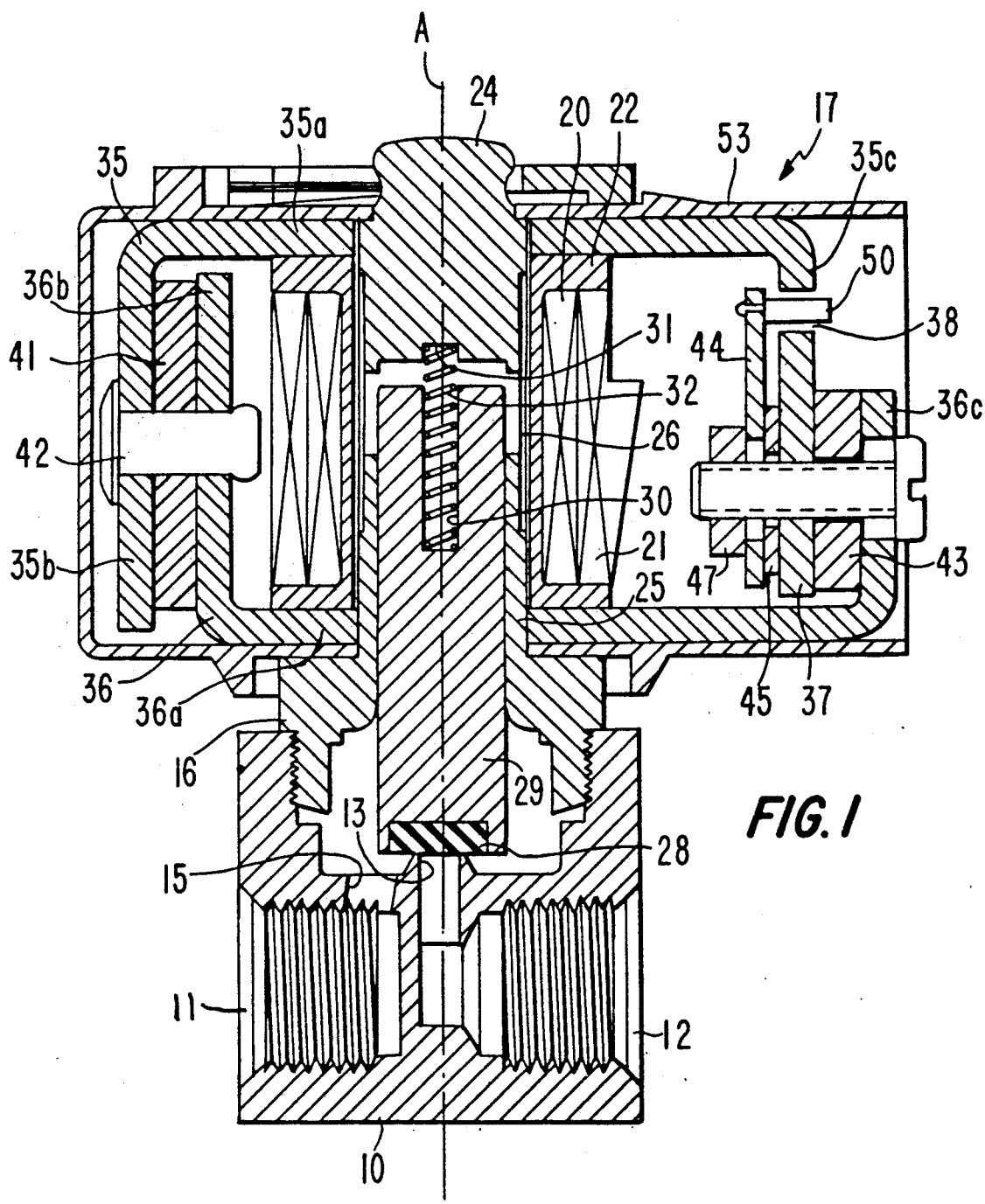
FIG. 1 is an axial cross-sectional view of a magnetic latch solenoid actuator assembled with a valve, the actuator being unlatched and the valve closed.

The solenoid actuator chosen to illustrate the present invention is a "magnetic latch" solenoid, but the invention could be used with other types of solenoid actuators. Also, although the solenoid actuator is illustrated and described operating a valve, it could be used to operate any type of device where such an actuator finds utility, such as remote-controlled door locks.

The solenoid operated valve of the present example (see FIGS. 1 and 2) includes a valve body 10 having an inlet port 11, an outlet port 12, and an orifice 13 between the ports surrounded by a valve seat 14. When the valve is open (FIG. 2), fluid flows from inlet port 11, through an internal passageway 15 in the valve body, and orifice 13, to outlet port 12. When the valve is closed (FIG. 1), orifice 13 is shut, preventing flow from port 11 to port 12. The valve also includes a bonnet 16 threaded into valve body 10 in a fluid-tight manner, which normally includes the use of suitable seals (not shown). Mounted on bonnet 16 is a solenoid actuator 17 according to the invention.

The actuator includes two concentric coils 20 and 21 of electrical wire wound on a spool 22, the coils being wound in opposite directions about an axis A. The coils may be energized through wires 23 connected to any suitable source of controlled electric current (not shown). Within the upper end of spool 22, and projecting beyond the spool, is a stationary armature, or plugnut, 24 of magnetic material. Within the lower end of the spool, and spaced from plugnut 24, is a core tube 25 of magnetic material. The core tube may be an extension of bonnet 16, or could be a separate element joined at its lower end to the bonnet in any suitable manner. Desirably, plugnut 24 and core tube 25 are integrally joined by a thin-walled sleeve 26 of non-magnetic material.

Slidable axially within core tube 25 is a movable armature, or core, 29 of magnetic material. At its lower end, core 29 carries a valve member 28 of resilient material, such as rubber. Core 29 is movable between a lower position (FIG. 1), in which it is spaced from plugnut 24, and valve member 28 engages valve seat 14 to close the valve, and an upper position (FIG. 2), in which it engages plugnut 24, and valve member 28 is spaced from valve seat 14, to open the valve. In its upper portion, core 29 is formed with an axial bore 30 opposite a shallow bore 31 in the lower face of plugnut 24. A compression spring 32 is located within these bores and constantly urges core 29 downwardly away from plugnut 24, to close the valve, i.e., press valve member 28 against valve seat 14.

A yoke of magnetic material, defining a magnetic circuit around coils 20 and 21, comprises three segments 35, 36, and 37. Segment 35 is generally L-shaped, and includes a horizontal leg 35a, extending across the top of spool 22, and a vertical leg 35b depending from one end of leg 35a. A hole in leg 35a accommodates plugnut 24. The free end 35c of leg 35a is bent through 90° and faces yoke segment 37, which is a vertical plate. Segment 37 is spaced from end 35c by a gap 38. Yoke segment 36 is generally U-shaped, and includes a horizontal central portion 36a, extending across the bottom of spool 22, and two vertical legs 36b and 36c. A hole in portion 36a accommodates core tube 25. Leg 36b is spaced inwardly from leg 35b, and leg 36c is spaced outwardly from yoke segment 37.

Between legs 35b and 36b is a relatively large and strong permanent magnet 41, the two legs and the magnet being joined together by a rivet 42 which extends through aligned holes in the legs and magnet. Between leg 36c and segment 37 is a relatively small and weak magnet 43. On the face of segment 37, opposite magnet 43, is a non-magnetic plate 44 spaced from the segment by a washer 45. A bolt 46, passing through aligned holes in leg 36c, magnet 43, segment 37, washer 45 and plate 44, cooperates with a nut 47 to bind together all those parts.

Plate 44 carries a magnetic flux sensor 50 positioned within gap 38 between yoke segment end 35c and yoke segment 37. The magnetic flux sensor may be a Hall effect device, and is preferably a Hall effect bipolar switch such as that sold by Sprague Electric Company under Catalog No. UGN-3131T/U or UGS-3131T/U. As with most Hall effect devices, sensor 50 has the ability to detect changes in magnetic flux. Thus, each time the magnetic flux adjacent to sensor 50 changes direction, sensor 50 switches its state in a detectable manner. Wires 51, electrically connected to sensor 50, extend from plate 44 and may be connected to a suitable indicator, e.g., a neon lamp. If the indicator is a lamp, it is arranged to be lit when the magnetic flux passing through sensor 50 is in one chosen direction, and is arranged to be dark when the magnetic flux is in the opposite direction.

Yoke 35,36,37 is so arranged that the magnetic circuit which it defines extends around coils 20 and 21, and the axis A extends across the magnetic circuit. Magnets 41 and 43 are located on opposite sides of the axis A. In the present example, yoke 35,36,37 has a generally rectangular shape, with the coils extending between opposite sides 35a and 36a of the rectangle and spaced from both of the other sides 36b and 37. A housing 53 encloses the yoke, and the parts surrounded and carried by the yoke, the housing being open at its right side, as viewed in FIGS. 1 and 2, to permit electrical connections to wires 23 and 51.

The changes in magnetic flux flowing through the yoke 35,36,37 will be further described with reference to FIGS. 3 and 4. When core 29 is in its position spaced from plugnut 24, and the valve is closed (FIG. 3), relatively large magnet 41 produces a magnetic flux, indicated by dot-dash arrows 55, flowing throughout the yoke, i.e., from magnet 41, through leg 35b and leg 35a, across gap 38, through segment 37, magnet 43, leg 36c, portion 36a, and leg 36b, back to magnet 41. Relatively small magnet 43 also produces a magnetic flux, indicated by dotted arrows 56, much weaker than the flux 55 produced by magnet 41. In addition, the polarities of the two magnets are so arranged that the fluxes which they produce oppose each other. However, in the condition of FIG. 3, the flux 55 produced by magnet 41 predominates over the flux 56 produced by magnet 43, and it is the flux 55 which is sensed by sensor 50. It should also be mentioned that the flux produced by magnet 41 is not strong enough to cause core 29 to rise toward plugnut 24 against the force of spring 32.

Figure 2:
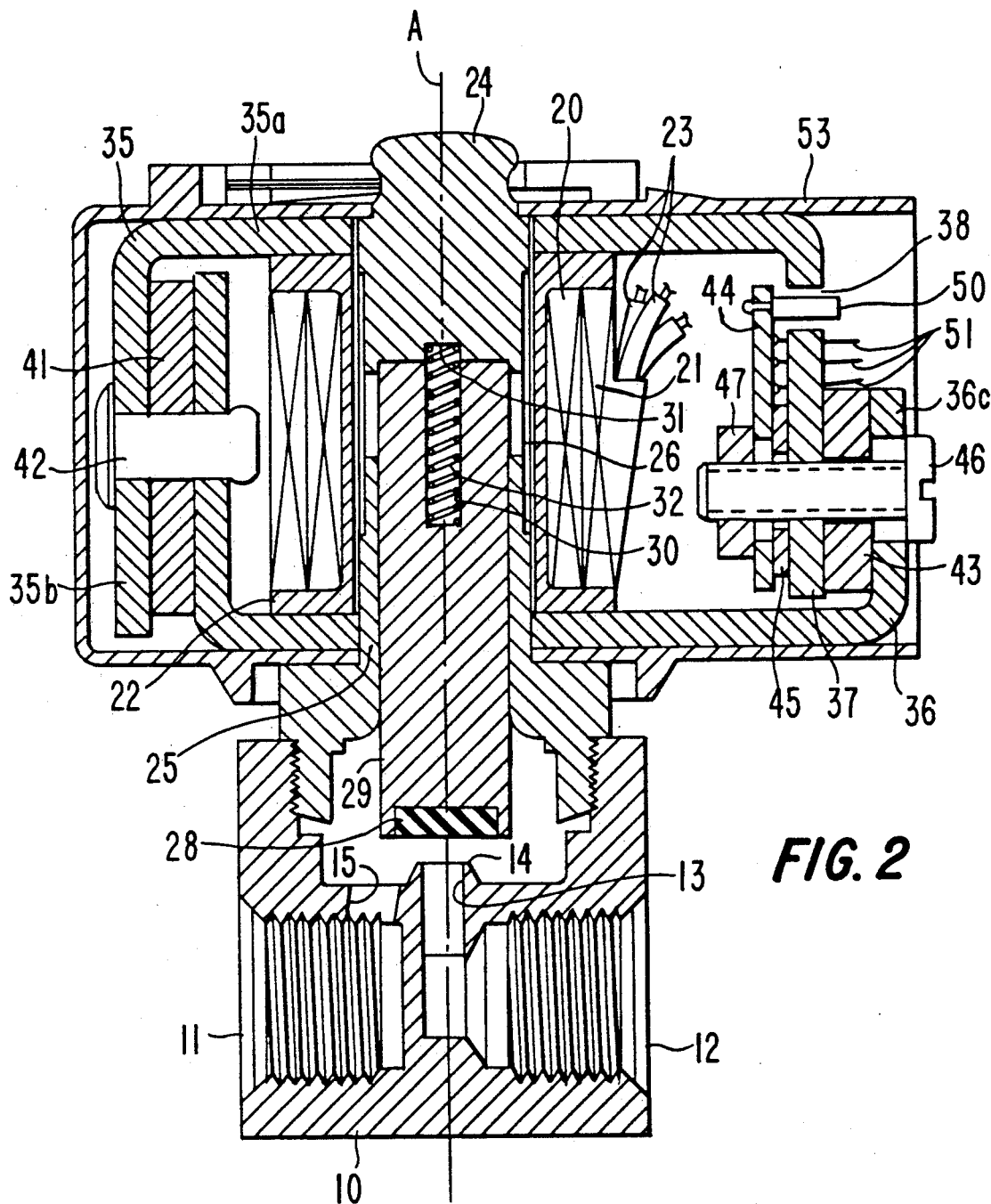
FIG. 2 is a view similar to FIG. 1, the actuator being latched and the valve open.
Figure 3:
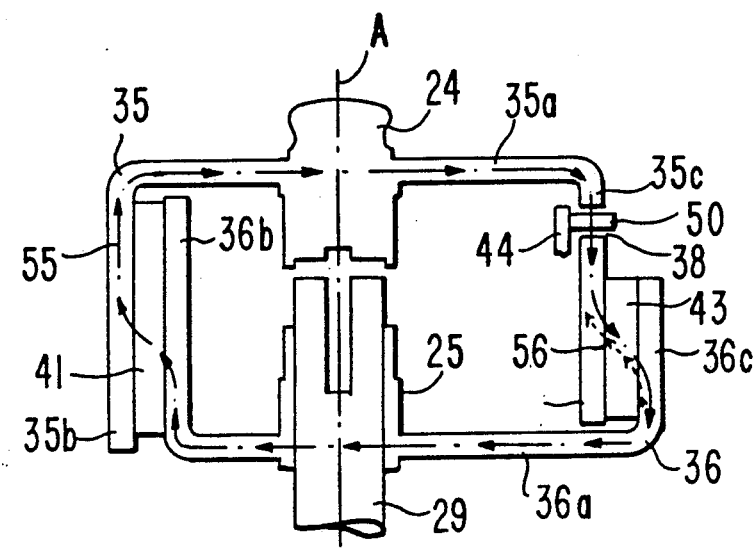
FIG. 3 is a schematic view of the magnetic circuit of the actuator showing the flow of magnetic flux when the actuator is unlatched.
Figure 4:
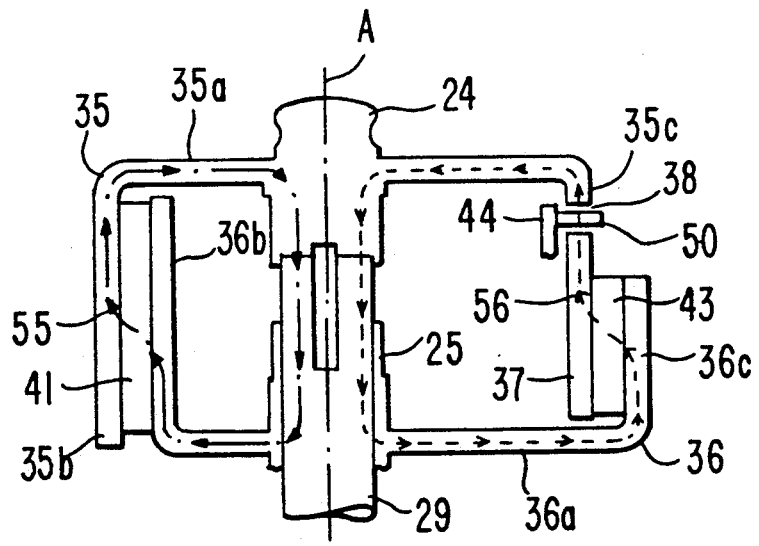
FIG. 4 is a view similar to FIG. 3 showing the flow of magnetic flux when the actuator is latched.

If it is desired to change the condition of the solenoid actuator, i.e., move core 29 from its position of FIGS. 1 and 3 to its position of FIGS. 2 and 4, and open the valve, one of the coils, say coil 20, is momentarily energized. Coil 20 is so wound that upon energization it produces a magnetic flux in the yoke which reinforces flux 55 produced by magnet 41. This flux is sufficient to cause core 29 to move into engagement with plugnut 24. The strength of magnet 41 is such that its flux is capable of maintaining the engagement of core 29 with plugnut 24, i.e., the core is "latched" to the plugnut by magnet 41, and the valve is open. With the spacing between the plugnut and core eliminated, the flux 55 produced by magnet 41 is shunted through the plugnut 24 and core 29, is shown in FIG. 4, and little or none of this flux flows through the portion of yoke 35,36,37 on the side of axis A which carries the magnet 43. As a result, the flux 56 produced by magnet 43 now predominates in that portion of the yoke, and flows from magnet 43, through segment 37, across gap 38, through leg 35a, plugnut 24, core 29, portion 36a, and leg 36c back to magnet 43. Since flux 56 flows in a direction opposite to that of flux 55, sensor 50 detects this change in flux direction and produces a signal for operating an indicator.

When the condition of the solenoid actuator is to be changed again, the other coil 21 is energized momentarily This coil is wound in a direction opposite to that of coil 20, and hence produces a flux in the opposite direction, a direction opposite to the direction of flux 55. If desired, only a single coil 20 could be used, and coil 21 eliminated. In such a case, coil 20 would be energized by a current of opposite polarity to that originally applied to coil, and this would have the effect of producing a magnetic flux flow in the opposite direction. The arrangement is such that the flux produced by coil 21 is about equal to the strength of flux 55 and hence momentarily neutralizes the flux produced by magnet 41. Consequently, spring 32 is free to separate core 29 from plugnut 24, and return the core to its position spaced from the plugnut (FIG. 1 and 3) wherein the valve is reclosed. With flux 55 no longer shunted by plugnut 24 and core 29, this flux again predominates throughout the magnetic circuit defined by the yoke (FIG. 3), and sensor 50 once again detects a reversal of flux direction, and produces a signal indicative thereof.

Thus, it will be appreciated that the direction of flux flow through the sensor 50 depends upon the condition of the solenoid actuator (FIG. 1 or FIG. 2), and hence the signal emitted by sensor 50 is indicative of the condition of the solenoid actuator.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

We claim:
1. A solenoid actuator comprising:
a coil means of electrical wire having an axis,
a plugnut within the coil means,
a core within the coil means and movable along the axis thereof between a position in which it engages the plugnut and a position in which it is spaced from the plugnut,
a yoke defining a magnetic circuit around the coil means, the axis of the coil means extending across the magnetic circuit,
a relatively large permanent magnet and a relatively small permanent magnet associated with the yoke on opposite sides of the coil means axis, the permanent magnets being arranged to produce flux in the yoke in opposite directions, and
a flux sensor adapted to sense the direction of magnetic flux in the yoke portion located on the same side of the coil means axis as the relatively small magnet.

2. A solenoid actuator as defined in claim 1 wherein the relative strengths of the large and small magnets are such that when the core is in its position spaced from the plugnut the magnetic flux produced by the large magnet predominates in the region of the yoke at which the flux sensor is located, and when the core is in its position in engagement with the plugnut the magnetic flux produced by the small magnet predominates in the region of the yoke at which the flux sensor is located.

3. A solenoid actuator as defined in claim 2 wherein when the core is in its position in engagement with the plugnut the magnetic flux produced by the large magnet is shunted through the plugnut and core, permitting the flux produced by the small magnet to predominate in the region of the yoke at which the flux sensor is located.

4. A solenoid actuator as defined in claim 1 wherein the yoke comprises a plurality of yoke segments, the segments being spaced from each other at two locations on opposite sides of the coil means axis, one of the magnets being positioned in each of those spaces to form parts of the magnetic circuit defined by the yoke.

5. A solenoid actuator as defined in claim 1 wherein the yoke has a generally rectangular shape, the coil means axis extending between two opposite sides of the rectangle and being spaced from both of the other sides of the rectangle.

6. A solenoid actuator as defined in claim 1 including a gap in the yoke defining an air gap in the magnetic circuit, the flux sensor being located within the gap.

7. A solenoid actuator as defined in claim 6 wherein the gap and flux sensor are located closer to the small magnet than to the large magnet.

8. A solenoid actuator as defined in claim 1 including means for momentarily energizing the coil means to cause the core to be attracted to the plugnut, the magnetic flux produced in the yoke by the large magnet serving to maintain the core in engagement with the plugnut after the coil is deenergized.

9. A solenoid actuator as defined in claim 8 including a spring urging the core toward its position spaced from the plugnut, and means for momentarily energizing the coil means to produce a magnetic flux in the yoke which neutralizes the flux produced by the large magnet, thereby permitting the spring to move the core away from the plugnut to its position spaced from the plugnut.

10. A solenoid actuator as defined in claim 1 wherein the coil means including two coaxial coils of electrical wire, the coils being wound in opposite directions.

11. A solenoid actuator as defined in claim 10 including means for energizing one of the coils to produce a magnetic flux in the yoke in a direction which reinforces the flux produced by the large magnet, and means for energizing the other of the coils to produce a magnetic flux in the yoke which neutralizes the flux produced by the large magnet.

12. A solenoid actuator as defined in claim 1 wherein the flux sensor is a Hall effect device.

13. A solenoid actuator as defined in claim 1 assembled with a valve body having an inlet port, an outlet port, and a valve seat between the ports, the core carrying a valve member movable into and out of engagement with the valve seat in response to movement of the core between its positions spaced from and engaging the plugnut.

14. A magnetic latch solenoid valve comprising:
a valve body having an inlet port, an outlet port, and an orifice between the ports surrounded by a valve seat,
a solenoid actuator mounted on the valve body, the actuator including:
a coil means of electrical wire having an axis,
a plugnut within the coil means,
a core within the coil means and movable along the axis thereof between a position in which it engages the plugnut and position in which it is spaced from the plugnut,
a valve member, movable in response to movement of the core, between a position engaging the valve seat, to close the valve, and a position spaced from the valve seat, to open the valve,
a yoke defining a magnetic circuit around the coil means, the axis of the coil means extending across the magnetic circuit,
a relatively large permanent magnet and a relatively small permanent magnet associated with the yoke on opposite sides of the coil means axis, the permanent magnets being arranged to produce flux in the yoke in opposite directions,
the flux throughout the yoke being in the direction of that produced by the large magnet when the core is in its position spaced from the plugnut, and the flux in a portion of the yoke nearer the small magnet being in the direction of that produced by the small magnet when the core is in its position engaging the plugnut, and
a flux sensor for sensing the direction of magnetic flux in the portion of the yoke nearer the small magnet, the change in flux direction sensed by the flux sensor being an indication of the closed or open condition of the valve.

* * * * *